(12) United States Patent
Komagata et al.

(10) Patent No.: US 10,248,384 B2
(45) Date of Patent: Apr. 2, 2019

(54) ARITHMETIC PROCESSING DEVICE AND CONTROL METHOD FOR ARITHMETIC PROCESSING DEVICE

(71) Applicant: FUJITSU LIMITED, Kawasaki-shi, Kanagawa (JP)

(72) Inventors: Makoto Komagata, Kawasaki (JP); Takumi Maruyama, Yokohama (JP); Shuji Yamamura, Yokohama (JP); Masato Nakagawa, Yokohama (JP); Masahiro Kuramoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/618,444

(22) Filed: Jun. 9, 2017

(65) Prior Publication Data
US 2018/0039480 A1 Feb. 8, 2018

(30) Foreign Application Priority Data

Aug. 3, 2016 (JP) .................. 2016-153060

(51) Int. Cl.
| | |
|---|---|
| *G06F 17/15* | (2006.01) |
| *G06F 7/544* | (2006.01) |
| *G06F 5/01* | (2006.01) |
| *G06F 7/483* | (2006.01) |
| *G06F 9/46* | (2006.01) |
| *G06N 99/00* | (2019.01) |
| *G06N 3/04* | (2006.01) |

(52) U.S. Cl.
CPC ............ *G06F 5/01* (2013.01); *G06F 7/483* (2013.01); *G06F 7/5443* (2013.01); *G06F 9/46* (2013.01); *G06F 17/153* (2013.01); *G06F 2207/3828* (2013.01); *G06N 3/04* (2013.01); *G06N 99/005* (2013.01)

(58) Field of Classification Search
CPC ... G06F 15/8084; G06F 7/5443; G06F 17/153
See application file for complete search history.

(56) References Cited

U.S. PATENT DOCUMENTS

| | | | |
|---|---|---|---|
| 6,931,238 B1 * | 8/2005 | Aizawa | ............... H04B 7/0604 370/280 |
| 2005/0251614 A1 | 11/2005 | Hasegawa | |
| 2010/0223219 A1 | 9/2010 | Kato et al. | |
| 2010/0318766 A1 | 12/2010 | Tsuji | |
| 2011/0239032 A1 | 9/2011 | Kato et al. | |

(Continued)

FOREIGN PATENT DOCUMENTS

| | | |
|---|---|---|
| JP | 2005-309499 | 11/2005 |
| JP | 2008-310700 | 12/2008 |

(Continued)

*Primary Examiner* — Chuong D Ngo
(74) *Attorney, Agent, or Firm* — Fujitsu Patent Center

(57) ABSTRACT

A plurality of floating-point registers store data therein. A processing execution unit executes arithmetic processing by using data stored in the floating-point registers. A first switch and a second switch select a route connecting the processing execution unit and the floating-point registers. A switch control unit controls the first switch and the second switch so as to switch a route to be selected, based on a switching instruction from the processing execution unit.

5 Claims, 19 Drawing Sheets

(56) References Cited

U.S. PATENT DOCUMENTS

2014/0189291 A1* 7/2014 Yang .................. G06F 9/30036
                                                        712/7
2015/0309961 A1   10/2015 Ozaki et al.
2017/0277567 A1*  9/2017 Lai ......................... G06F 15/80

FOREIGN PATENT DOCUMENTS

| | | |
|---|---|---|
| JP | 2010-134697 | 6/2010 |
| JP | 2011-002908 | 1/2011 |
| JP | 2012-205298 | 10/2012 |
| JP | 2015-210709 | 11/2015 |

* cited by examiner

| srcxb1 | srcxb2 |
|---|---|
| #1 | ##1 |
| #2 | ##2 |
| #3 | ##3 |
| #4 | ##4 |
| ⋮ | ⋮ |

| PATTERN SELECTION VALUE | STORAGE-SOURCE REGISTER | | | |
|---|---|---|---|---|
| #1 | f(n+0) | f(n+1) | f(n+2) | f(n+3) |
| #2 | f(n+1) | f(n+2) | f(n+3) | f(n+4) |
| #3 | f(n+2) | f(n+3) | f(n+4) | f(n+5) |
| #4 | f(n+3) | f(n+4) | f(n+5) | f(n+6) |
| ⋮ | ⋮ | ⋮ | ⋮ | ⋮ |
| ##1 | f(n+0) | f(n+0) | f(n+0) | f(n+0) |
| ##2 | f(n+1) | f(n+1) | f(n+1) | f(n+1) |
| ##3 | f(n+2) | f(n+2) | f(n+2) | f(n+2) |
| ##4 | f(n+3) | f(n+3) | f(n+3) | f(n+3) |
| ⋮ | ⋮ | ⋮ | ⋮ | ⋮ |

```
fma,s(f0,f1,f2,f3),(f64,f64,f64,f64),(f80,f81,f82,f83)=>(f80,f81,f82,f83)
fma,s(f1,f2,f3,f4),(f65,f65,f65,f65),(f80,f81,f82,f83)=>(f80,f81,f82,f83)
fma,s(f2,f3,f4,f5),(f66,f66,f66,f66),(f80,f81,f82,f83)=>(f80,f81,f82,f83)
fma,s(f8,f9,f10,f11),(f68,f68,f68,f68),(f80,f81,f82,f83)=>(f80,f81,f82,f83)
fma,s(f9,f10,f11,f12),(f69,f69,f69,f69),(f80,f81,f82,f83)=>(f80,f81,f82,f83)       }251
fma,s(f10,f11,f12,f13),(f70,f70,f70,f70),(f80,f81,f82,f83)=>(f80,f81,f82,f83)
fma,s(f16,f17,f18,f19),(f72,f72,f72,f72),(f80,f81,f82,f83)=>(f80,f81,f82,f83)
fma,s(f17,f18,f19,f20),(f73,f73,f73,f73),(f80,f81,f82,f83)=>(f80,f81,f82,f83)
fma,s(f18,f19,f20,f21),(f74,f74,f74,f74),(f80,f81,f82,f83)=>(f80,f81,f82,f83)
fma,s(f4,f5,0,0),(f64,f64,0,0),(f84,f85,0,0)=>(f84,f85,0,0)
fma,s(f5,f6,0,0),(f65,f65,0,0),(f84,f85,0,0)=>(f84,f85,0,0)
                        ⋮                                                           }252
fma,s(f22,23,0,0),(f74,f74,0,0),(f84,f85,0,0)=>(f84,f85,0,0)

fma,s(f8,f9,f10,f11),(f64,f64,f64,f64),(f85,f86,f87,f88)=>(f85,f86,f87,f88)
                        ⋮                                                           }253
fma,s(f30,31,0,0),(f74,f74,0,0),(f90,f91,0,0)=>(f90,f91,0,0)

fma,s(f16,f17,f18,f19),(f64,f64,f64,f64),(f92,f93,f94,f95)=>(f92,f93,f94,f95)       }254
                        ⋮
```

FIG.8

```
fma,s %f0,  %f65,(#1,##1),  %f80=>%f80
fma,s %f0,  %f65,(#2,##2),  %f80=>%f80
fma,s %f0,  %f65,(#3,##3),  %f80=>%f80
fma,s %f8,  %f68,(#1,##1),  %f80=>%f80
fma,s %f8,  %f68,(#2,##2),  %f80=>%f80
fma,s %f8,  %f68,(#3,##3),  %f80=>%f80
fma,s %f16, %f72,(#1,##1),  %f80=>%f80
fma,s %f16, %f72,(#2,##2),  %f80=>%f80
fma,s %f16, %f72,(#3,##3),  %f80=>%f80
```

FIG.9

SIMD_N: NUMBER OF PIECES OF SIMD
X_MAX: NUMBER OF PIXELS IN X DIRECTION OF IMAGE
Y_MAX: NUMBER OF PIXELS IN Y DIRECTION OF IMAGE

```
for(j=0;j<Y_MAX;j++){
 mov(0,0,0,0), %80
 for(i=0;i<X_MAX;i=i+SIMD_N){
  ld,s g(i,j), %f0
  ld,s g(i+1,j), %f4           ←——— 261
  for(k=0;k=SIMD_N-1;k++)
   ld,s f(1,k), %f64           ←——— 262 fma,s %f0, %f64,(1,5), %80
  fma,s %f0, %f64,(1,5), %80   ←——— 263
  fma,s %f0, %f64,(1,5), %80
 }
 st,s %f81,t(i,j)              ←——— 264
}
```

| dst | src |
|---|---|
| #1 | #1 |
| #9 | #2 |
| #10 | #3 |
| #11 | #4 |
| ⋮ | ⋮ |

| f(n+8*7+0) | f(n+8*7+1) | f(n+8*7+2) | f(n+8*7+3) | f(n+8*7+4) | f(n+8*7+5) | f(n+8*7+6) | f(n+8*7+7) |
|---|---|---|---|---|---|---|---|
| f(n+8*6+0) | f(n+8*6+1) | f(n+8*6+2) | f(n+8*6+3) | f(n+8*6+4) | f(n+8*6+5) | f(n+8*6+6) | f(n+8*6+7) |
| f(n+8*5+0) | f(n+8*5+1) | f(n+8*5+2) | f(n+8*5+3) | f(n+8*5+4) | f(n+8*5+5) | f(n+8*5+6) | f(n+8*5+7) |
| f(n+8*4+0) | f(n+8*4+1) | f(n+8*4+2) | f(n+8*4+3) | f(n+8*4+4) | f(n+8*4+5) | f(n+8*4+6) | f(n+8*4+7) |
| f(n+8*3+0) | f(n+8*3+1) | f(n+8*3+2) | f(n+8*3+3) | f(n+8*3+4) | f(n+8*3+5) | f(n+8*3+6) | f(n+8*3+7) |
| f(n+8*2+0) | f(n+8*2+1) | f(n+8*2+2) | f(n+8*2+3) | f(n+8*2+4) | f(n+8*2+5) | f(n+8*2+6) | f(n+8*2+7) |
| f(n+8*1+0) | f(n+8*1+1) | f(n+8*1+2) | f(n+8*1+3) | f(n+8*1+4) | f(n+8*1+5) | f(n+8*1+6) | f(n+8*1+7) |
| f(n+8*0+0) | f(n+8*0+1) | f(n+8*0+2) | f(n+8*0+3) | f(n+8*0+4) | f(n+8*0+5) | f(n+8*0+6) | f(n+8*0+7) |

FIG.17

| PATTERN SELECTION VALUE | FLOATING-POINT REGISTER TO BE SELECTED | | | | | | | 142 |
|---|---|---|---|---|---|---|---|---|
| #1  | n+8*0+0 | n+8*1+1 | n+8*2+2 | n+8*3+3 | n+8*4+4 | n+8*5+5 | n+8*6+6 | n+8*7+7 |
| #2  | n+8*0+1 | n+8*1+2 | n+8*2+3 | n+8*3+4 | n+8*4+5 | n+8*5+6 | n+8*6+7 | n+8*7+0 |
| #3  | n+8*0+2 | n+8*1+3 | n+8*2+4 | n+8*3+5 | n+8*4+6 | n+8*5+7 | n+8*6+0 | n+8*7+1 |
| #4  | n+8*0+3 | n+8*1+4 | n+8*2+5 | n+8*3+6 | n+8*4+7 | n+8*5+0 | n+8*6+1 | n+8*7+2 |
| #5  | n+8*0+4 | n+8*1+5 | n+8*2+6 | n+8*3+7 | n+8*4+0 | n+8*5+1 | n+8*6+2 | n+8*7+3 |
| #6  | n+8*0+5 | n+8*1+6 | n+8*2+7 | n+8*3+0 | n+8*4+1 | n+8*5+2 | n+8*6+3 | n+8*7+4 |
| #7  | n+8*0+6 | n+8*1+7 | n+8*2+0 | n+8*3+1 | n+8*4+2 | n+8*5+3 | n+8*6+4 | n+8*7+5 |
| #8  | n+8*0+7 | n+8*1+0 | n+8*2+1 | n+8*3+2 | n+8*4+3 | n+8*5+4 | n+8*6+5 | n+8*7+6 |
| #9  | n+8*1+0 | n+8*2+1 | n+8*3+2 | n+8*4+3 | n+8*5+4 | n+8*6+5 | n+8*7+6 | n+8*0+7 |
| #10 | n+8*2+0 | n+8*3+1 | n+8*4+2 | n+8*5+3 | n+8*6+4 | n+8*7+5 | n+8*0+6 | n+8*1+7 |
| #11 | n+8*3+0 | n+8*4+1 | n+8*5+2 | n+8*6+3 | n+8*7+4 | n+8*0+5 | n+8*1+6 | n+8*2+7 |
| #12 | n+8*4+0 | n+8*5+1 | n+8*6+2 | n+8*7+3 | n+8*0+4 | n+8*1+5 | n+8*2+6 | n+8*3+7 |
| #13 | n+8*5+0 | n+8*6+1 | n+8*7+2 | n+8*0+3 | n+8*1+4 | n+8*2+5 | n+8*3+6 | n+8*4+7 |
| #14 | n+8*6+0 | n+8*7+1 | n+8*0+2 | n+8*1+3 | n+8*2+4 | n+8*3+5 | n+8*4+6 | n+8*5+7 |
| #15 | n+8*7+0 | n+8*0+1 | n+8*1+2 | n+8*2+3 | n+8*3+4 | n+8*4+5 | n+8*5+6 | n+8*6+7 |

FIG.18

```
                                    ⌠320
mvfr %f0, %64, (#1,#1)
mvfr %f0, %64, (#2,#9)
mvfr %f0, %64, (#3,#10)
mvfr %f0, %64, (#4,#11)
mvfr %f0, %64, (#5,#12)
mvfr %f0, %64, (#6,#13)
mvfr %f0, %64, (#7,#14)
mvfr %f0, %64, (#8,#15)
```

ARITHMETIC PROCESSING DEVICE AND CONTROL METHOD FOR ARITHMETIC PROCESSING DEVICE

CROSS-REFERENCE TO RELATED APPLICATION

This application is based upon and claims the benefit of priority of the prior Japanese Patent Application No. 2016-153060, filed on Aug. 3, 2016, the entire contents of which are incorporated herein by reference.

FIELD

The embodiments discussed herein are related to an arithmetic processing device and a control method for an arithmetic processing device.

BACKGROUND

In recent years, artificial intelligence can perform processing such as identification and prediction highly accurately by performing machine learning. Further, in machine learning, a technique referred to as "deep machine learning (deep learning)", which is a learning method using a neural network having a multiple structure, is attracting attention. As for learning using the deep learning, many elements of matrix calculation are used.

A GPU (Graphics Processing Unit) that is used for an arithmetic processing device is originally a processor for image processing. However, because the GPU includes a plurality of product-sum arithmetic units and is suitable for matrix calculation, it is frequently used as a processor that performs processing for signal learning. Also in the processing for performing deep learning, it is a common procedure to use a GPU.

The deep learning includes processing referred to as "convolutional neural network", which is mainly used in image recognition. In the convolutional neural network, an operation referred to as "convolution" is frequently used. In the following descriptions, it is referred to as "convolution operation". For example, when image recognition is performed, a weight frame having predetermined parameters as respective elements is arranged in an original image, in a region on an input image. By adding the respective elements in the input image in which the weight frame is arranged and the respective elements in the weight frame, a feature amount of the region in the input image in which the weight frame is arranged is calculated. The arrangement of the weight frame in the original image is performed for the entire input image by using a predetermined shift width of the weight frame, and an integrated amount of the calculated feature amounts becomes an output image to be output as a result of convolution operation. The weight frame may be referred to as "filter".

For example, as an input image, an image having 8×8 elements, that is, an 8×8 bit gray scale image, is considered here. In the following descriptions, the image is referred to as "8×8 input image". A case where a filter having 4×4 elements is used and the filter is shifted by one column or by one row in the input image is described here. In the following descriptions, the filter is referred to as "4×4 filter". In this case, if the filter arranged at one end of the input image in a row direction is shifted by 8−3 times, the filter reaches the other end of the input image. That is, an output image has five elements in the row direction. Similarly, if the filter arranged at one end of the input image in a column direction is shifted by 8−3=5 times, the filter reaches the other end of the input image. That is, an output image has five elements in the column direction. Therefore, the output image becomes a 5×5 image. The respective elements of the output image have a total value obtained by multiplying the respective elements of the filter by the respective elements of the input image at the positions corresponding to the respective elements, in a state in which the filter is arranged in the input image.

As described above, at the time of carrying out an operation of adding multiplied values, the arithmetic processing device frequently uses a command referred to as "fma (Fused Multiply Add)". The fma is a command to perform a product-sum operation of a floating point expressed in a form of $(A \times B) + C$.

Further, when such a convolution operation is performed, there may be a case of using a method referred to as "SIMD (Single Instruction Multiple Data)", in which one command is simultaneously applied to a plurality of pieces of data and a plurality of operations are performed in parallel to obtain a plurality of outputs simultaneously. As an example, an operation using the SIMD processing four pieces of data in parallel is described. In the following descriptions, the SIMD that processes n pieces of data in parallel is referred to as "nSIMD". That is, the arithmetic processing in this case can be referred to as "4SIMD". In the following descriptions, the operation using the SIMD is referred to as "SIMD operation".

In the case of the convolution operation using the 8×8 input image and the 4×4 filter described above, an arithmetic device can calculate at a time four values, which are results of multiplication of one element of a filter, in an arranged state in which filters are shifted by one column four times, by a corresponding element of the input image. That is, in the case of performing the 4SIMD operation, the arithmetic processing device can calculate elements of an output image corresponding to the states of the filter in four different arrangements.

In the case of performing the arithmetic operation using the SIMD, the arithmetic processing device performs one operation after storing data to be used for one operation, among the pieces of input image data stored in a memory, in a register used in the SIMD operation. By repeating this processing, the arithmetic processing device can perform the convolution operation. For example, in the case of the 4SIMD arithmetic processing, there are four registers to be used for one SIMD operation. The registers of the number to be used for one SIMD operation in this manner are collectively referred to as "one SIMD register". At the time of storing the data in the SIMD register, the arithmetic processing device uses an SIMD load command to store the data in all the registers of the SIMD register at a time.

In the convolution operation, when obtaining one element of the output image, respective elements of the filter and respective elements of the input image corresponding thereto are used. Further, in the convolution operation using the SIMD, a value used in one convolution operation of the parallel convolution operations is used for other convolution operations. Therefore, when performing the convolution operation using the SIMD, it is desired to share the value stored in the respective registers of the SIMD register in the parallel convolution operations. However, the filter is shifted by predetermined columns and predetermined rows on an input screen. Therefore, the values stored in respective registers of the SIMD register are shared with other convolution operations, and the used value is discarded and a new value is stored in the register. In the following descriptions, the processing in which a used value is deleted, another value is shared for other convolution operations, and a new value is stored in the register is referred to as "rotate".

An SIMD command includes, for example, a shuffle command and a broadcast command. The shuffle command is a command to replace data stored in the register. The broadcast command is a command to copy data stored in one register and arrange the data in other registers. Conventionally, the shuffle command has been used as the SIMD command to realize rotate.

For example, as the technique related to the convolution operation, there is a conventional technique in which a multiplier is provided for each line, a shift register that stores weights of the respective lines is provided, multiplication is performed sequentially by shifting a value, and the multiplication results are added. There is another conventional technique in which a multiplier is provided corresponding to each line so as to share the multiplier between adjacent lines to perform a convolution operation. There is also a conventional technique in which a memory is divided into a region for storing line data and a region for storing weight data, and memory regions are circulated to perform an operation. There is also a conventional technique of performing an operation by delivering an output of a multiplier to another multiplier. There is also a conventional technique in which an SIMD register has a bank configuration, and data at an arbitrary position of an arbitrary register is set as data to be supplied to each arithmetic unit, thereby making rearrangement of data in the register unnecessary. There is another conventional technique in which, at the time of loading data into an SIMD register, the data is copied to a buffer register, and data at an arbitrary position of an arbitrary register is set as data to be supplied to respective arithmetic units, thereby making rearrangement of data in the register unnecessary.

However, the SIMD command accesses the register in the same SIMD register. That is, by the SIMD command, it is difficult to shift data in a register in a certain SIMD register to a register in another SIMD register. Therefore, for example, when performing rotate, other than the shuffle command, a command to retrieve data from a certain SIMD register and shift the data to another SIMD register is added. In order to realize the rotate by using the SIMD command as described above, another command needs to be used, thereby making the processing redundant to decrease the arithmetic processing speed.

Further, in the conventional technique of sequentially performing multiplication by using a shift register provided for each line that stores the weight of each line, and a conventional technique in which a multiplier is provided to share the multiplier by adjacent lines, the SIMD command is not taken into consideration. Further, in the conventional technique of performing an operation by dividing a memory into a region for storing a line data and a region for storing weight data, and the conventional technique of performing an operation by delivering an output of a multiplier to another multiplier, the SIMD command is not taken into consideration. Therefore, even if these conventional techniques are used, it is difficult to improve the arithmetic processing speed.

SUMMARY

According to an aspect of an embodiment, an arithmetic processing device includes: a plurality of storage units that store data therein; a processing execution unit that performs arithmetic processing by using data stored in the storage units; a route selection unit that selects a route connecting the processing execution unit and the storage units; and a switching control unit that controls the route selection unit so as to switch a route to be selected, based on a switching instruction from the processing execution unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a switch switching table according to the first embodiment;

FIG. 7 is a diagram illustrating a convolution operation when a 4SIMD command is used;

FIG. 8 is an example of an SIMD command to cause a convolution operation to be executed;

FIG. 9 is a diagram illustrating a pseudo-code of a convolution operation using a crossbar switch;

FIG. 16 is a diagram illustrating floating-point registers representing an 8×8 matrix;

FIG. 17 is a diagram illustrating a switch switching table according to the second embodiment;

FIG. 18 is a diagram illustrating an SIMD command to execute transposition of matrix;

FIG. 19 is an explanatory diagram of a first shifting process of transposition of matrix;

FIG. 20 is an explanatory diagram of a second shifting process of transposition of matrix;

FIG. 21 is an explanatory diagram of a third shifting process of transposition of matrix.

DESCRIPTION OF EMBODIMENTS

Preferred embodiments of the present invention will be explained with reference to accompanying drawings. The arithmetic processing device and a control method for an arithmetic processing device disclosed in the present application are not limited to the following embodiments.

[a] First Embodiment

Figure 1:
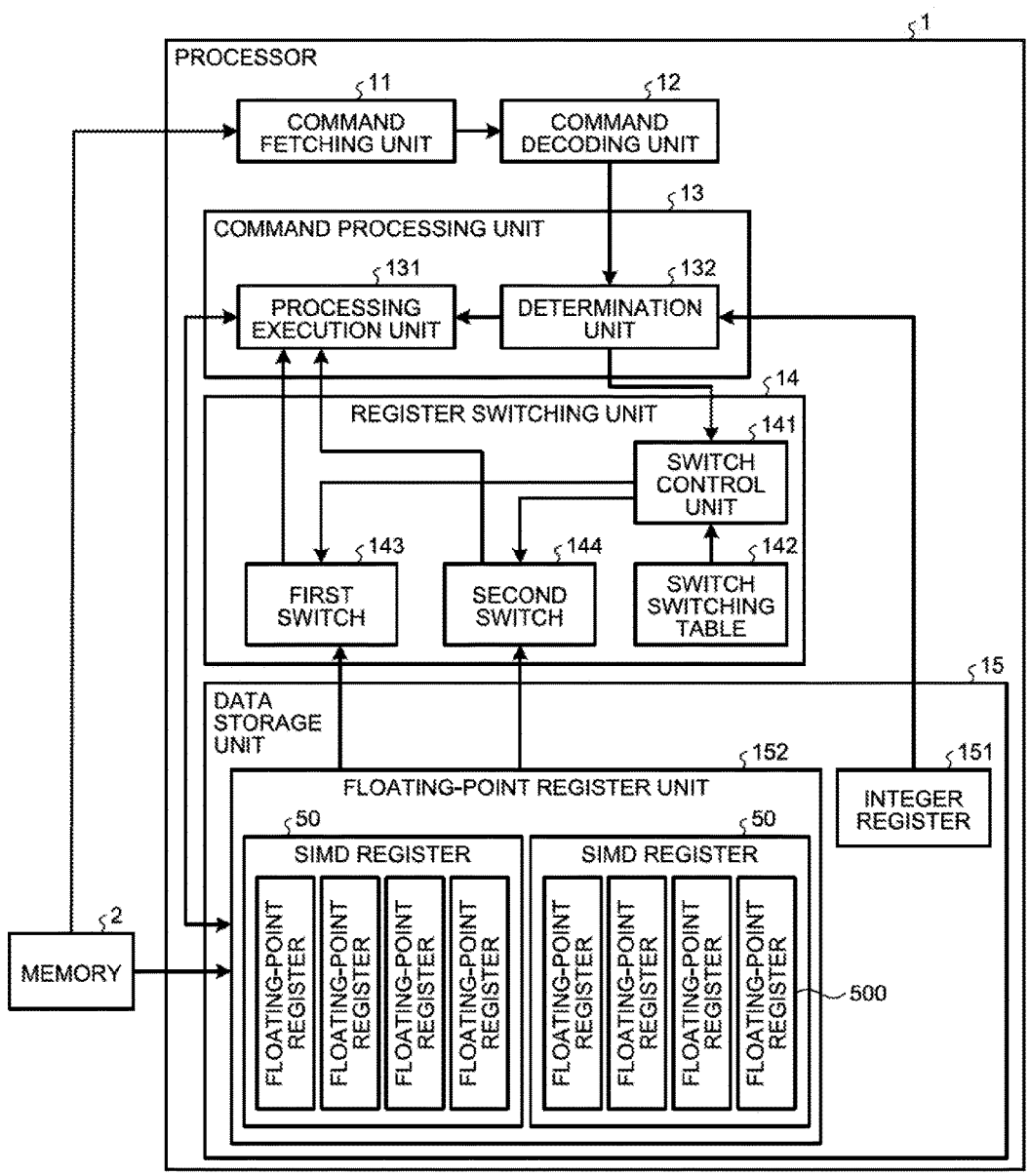
FIG. 1 is a block diagram of a 4SIMD processor according to a first embodiment.

FIG. 1 is a block diagram of a 4SIMD processor according to a first embodiment. As illustrated in FIG. 1, a processor 1 being an arithmetic processing device includes a command fetching unit 11, a command decoding unit 12, a command processing unit 13, a register switching unit 14, and a data storage unit 15.

The data storage unit 15 stores therein data to be used for arithmetic processing at the time of executing a command. The data storage unit 15 includes an integer register 151 and a floating-point register unit 152.

Figures 2, 3:
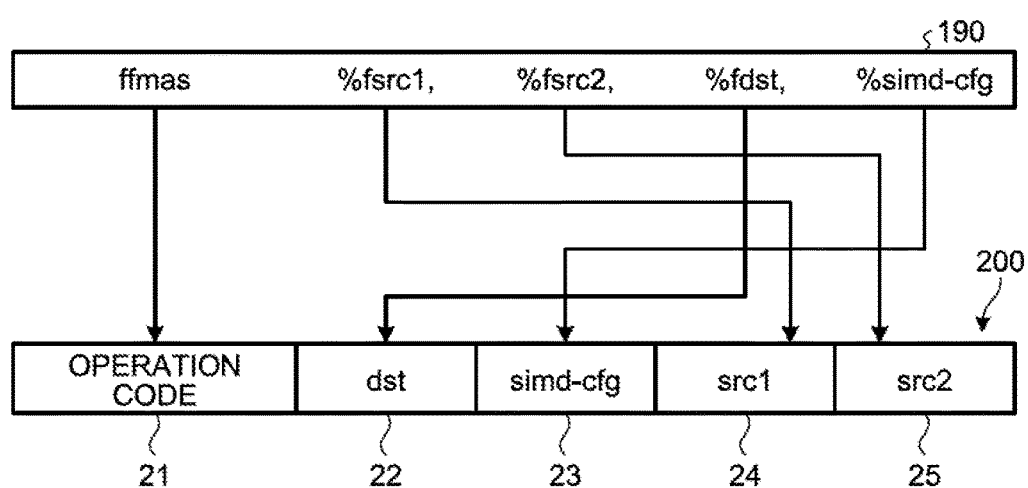
FIG. 2 is a diagram of an example of a format of an integer register when an SIMD command to perform a convolution operation is processed.
FIG. 3 is a diagram illustrating an example of an assembly language description of an SIMD command to execute convolution and a format of an SIMD command to be generated.

In the case of performing the SIMD operation, a pattern selection value corresponding to a value of simd-cfg (configuration) designated by an SIMD command as illustrated in FIG. 2 is pre-stored in the integer register 151 or set before the processing. The number of integer registers is not particularly limited to any specific number. The pattern selection value is information for selecting a switching pattern. FIG. 2 is a diagram of an example of a format of the integer register when the SIMD command to perform the convolution operation is processed. A pattern selection value expressed by srcxb (Source Cross Bar) 1 for designating four switching patterns of a first switch 143 described later in one SIMD operation is stored in an upper level of the integer register 151, as indicated in a format 153. A pattern selection value expressed by srcxb2 for designating four switching patterns of a second switch 144 described later in one SIMD operation is stored in a lower level of the integer register 151, as indicated in the format 153.

The floating-point register unit 152 includes a plurality of floating-point registers 500. The floating-point register 500 is an example of "storage unit". When the SIMD operation is to be performed, an SIMD register 50 is formed by putting floating-point registers 500 in a preset number of pieces of SIMD together. A case where the number of pieces of SIMD is four is described here. That is, one SIMD register 50 is formed by putting four floating-point registers 500 together. In FIG. 1, two SIMD registers 50 and the floating-point registers 500 included therein are illustrated as an example. However, the number of floating-point registers 500 and the number of pieces of SIMD registers 50 are not particularly limited to any specific number.

The command fetching unit 11 acquires a command from a memory 2. For example, as illustrated in FIG. 3, an operation code expressing a command type is added to the command acquired by the command fetching unit 11. FIG. 3 is a diagram illustrating an example of an assembly language description of an SIMD command to execute convolution and a format of an SIMD command to be generated. Corresponding to the operation code and respective operands designated by an assemble language notation 190, an operation code 21, destination information (dst: destination) 22, storage-source information 23 of SIMD setting information (simd-cfg), and first storage-source information (src (source) 1) 24 and second storage-source information (src2) 25 are stored in a SIMD command 200. For example, the operation code 21 is command type information. The destination information 22 is a register number of an output destination. The storage-source information 23 of the SIMD setting information is an integer register number of a place where the SIMD setting information having a format of an integer register illustrated in FIG. 2 is stored. The first storage-source information 24 and the second storage-source information 25 are register numbers of input sources 1 and 2. The command fetching unit 11 outputs the acquired command to the command decoding unit 12.

The command decoding unit 12 receives an input of a command from the command fetching unit 11. Next, the command decoding unit 12 performs decoding of the acquired command to acquire the command type represented by the operation code. The command decoding unit 12 determines whether the acquired command is the SIMD command or other commands such as four arithmetic operations based on the acquired command type. A command other than the SIMD command is referred to as "other commands". The command decoding unit 12 outputs the decoded command to the command processing unit 13 together with a determination result of the command type.

The command processing unit 13 executes the command input from the command decoding unit 12. More specifically, the command processing unit 13 includes a processing execution unit 131 and a determination unit 132.

The determination unit 132 receives an input of a command from the command decoding unit 12. When having acquired the other commands, the determination unit 132 outputs the acquired commands to the processing execution unit 131.

Meanwhile, when having acquired the SIMD command 200, the determination unit 132 acquires a pattern selection value corresponding to the simd-cfg included in the SIMD command 200 from the integer register 151. Specifically, the determination unit 132 acquires information designating the switching pattern of the four floating-point registers 500 designated by scr1 and information designating the switching pattern of the four floating-point registers 500 designated by scr2 as the pattern selection values.

The determination unit 132 outputs the pattern selection values corresponding to the simd-cfg included in the SIMD command 200 to a switch control unit 141. The determination unit 132 also outputs the SIMD command 200 to the processing execution unit 131.

The processing execution unit 131 receives an input of the command from the determination unit 132. When the acquired command is the other commands, the processing execution unit 131 performs the arithmetic processing according to the acquired other commands.

On the other hand, when the acquired command is the SIMD command 200, the processing execution unit 131 acquires data from the floating-point register 500 designated by the destination information without via the register switching unit 14. In the following descriptions, the data acquired from the floating-point register 500 designated by the destination information is referred to as "destination data".

The processing execution unit 131 acquires data from the floating-point register 500 represented by the first storage-source information via the first switch 143 of the register switching unit 14. At this time, the processing execution unit 131 acquires four pieces of data from the four floating-point registers 500 respectively connected to each other while being matched with switching of the first switch 143 four times. In the following descriptions, the data acquired via the first switch 143 is referred to as "first storage-source data".

Next, the processing execution unit 131 acquires data from the floating-point register 500 represented by the second storage-source information via the second switch 144 of the register switching unit 14. At this time, the processing execution unit 131 acquires four pieces of data from the four floating-point registers 500 respectively connected to each other while being matched with switching of the second switch 144 four times. In the following descriptions, the data acquired via the second switch 144 is referred to as "second storage-source data".

Figure 4:
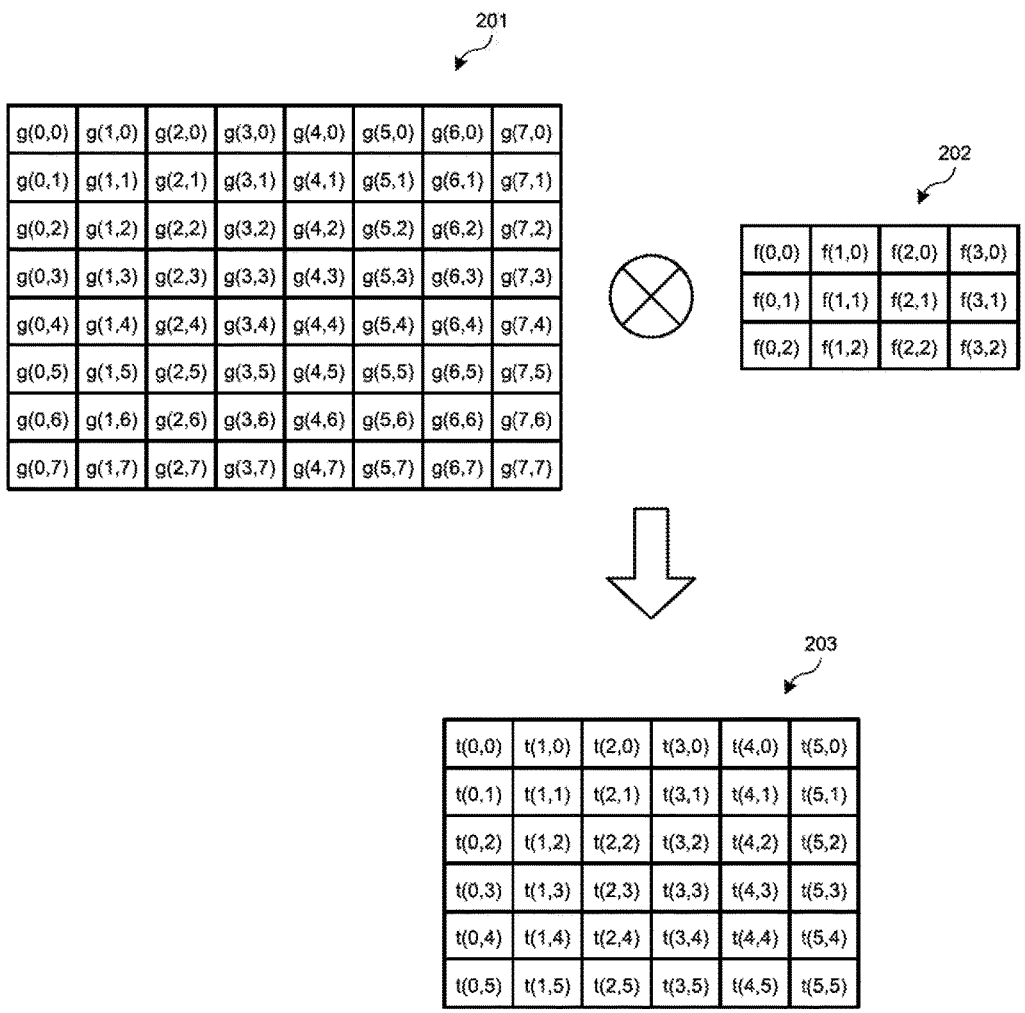
FIG. 4 is an explanatory diagram of an example of a convolution operation.

Thereafter, the processing execution unit 131 uses the destination data, the first storage-source data, and the second storage-source data to perform the SIMD operation according to the command, thereby performing the convolution operation. FIG. 4 is an explanatory diagram of an example of the convolution operation. FIG. 4 illustrates a case where a convolution operation is performed with respect to input image data 201 having 8×8 pixels by using 3×3 elements in a filter 202 having 3×4 elements, and outputs 5×5 pieces of output image data 203. That is, the processing execution unit 131 performs the convolution operation with respect to the input image data 201 by using the 3×3 elements in the filter 202 to generate the output image data 203. The convolution operation performed by the processing execution unit 131 according to the first embodiment is described later in detail.

When the SIMD command is to be executed, the register switching unit 14 switches a route between the processing execution unit 131 and the floating-point register 500. More specifically, the register switching unit 14 includes the switch control unit 141, a switch switching table 142, the first switch 143, and the second switch 144.

As illustrated in FIG. 5, a set of storage-source registers corresponding to the respective pattern selection values are registered in the switch switching table 142. FIG. 5 is a diagram illustrating an example of the switch switching table according to the first embodiment. n is a base register number. In the first embodiment, because the number of pieces of SIMD is four, and calculation can be performed four times at a time, the four storage-source registers are sequentially designated with respect to one pattern selection value.

The switch control unit 141 receives an input of the pattern selection value from the determination unit 132. The pattern selection value is an example of "switching instruction". The switch control unit 141 acquires information of the storage-destination register corresponding to the acquired pattern selection value from the switch switching table 142.

Thereafter, the switch control unit 141 sequentially switches the route of the first switch 143 so that the processing execution unit 131 is sequentially connected to the four storage-destination registers corresponding to the acquired pattern selection value of srcxb1. The switch control unit 141 sequentially switches the route of the second switch 144 so that the processing execution unit 131 is sequentially connected to the four storage-destination registers corresponding to the acquired pattern selection value of srcxb2. The switch control unit 141 is an example of "switch control unit".

The first switch 143 and the second switch 144 are switches that switch the route connecting the processing execution unit 131 and the floating-point registers 500, respectively. In the case of the first embodiment to perform a convolution operation using the SIMD, the first switch 143 forms a route connecting to the floating-point registers 500 that store therein pixel values included in the input image data 201. The second switch 144 also forms a route connecting to the floating-point registers 500 that store therein element values included in the filter 202. The first switch 143 and the second switch 144 are examples of "route selection unit".

In FIG. 1, the first switch 143 and the second switch 144 are connected to the floating-point register unit 152. However, in practice, the first switch 143 and the second switch 144 have routes connecting to the respective floating-point registers 500, and operate to select a route connected to the processing execution unit 131 among the routes.

Figure 6:
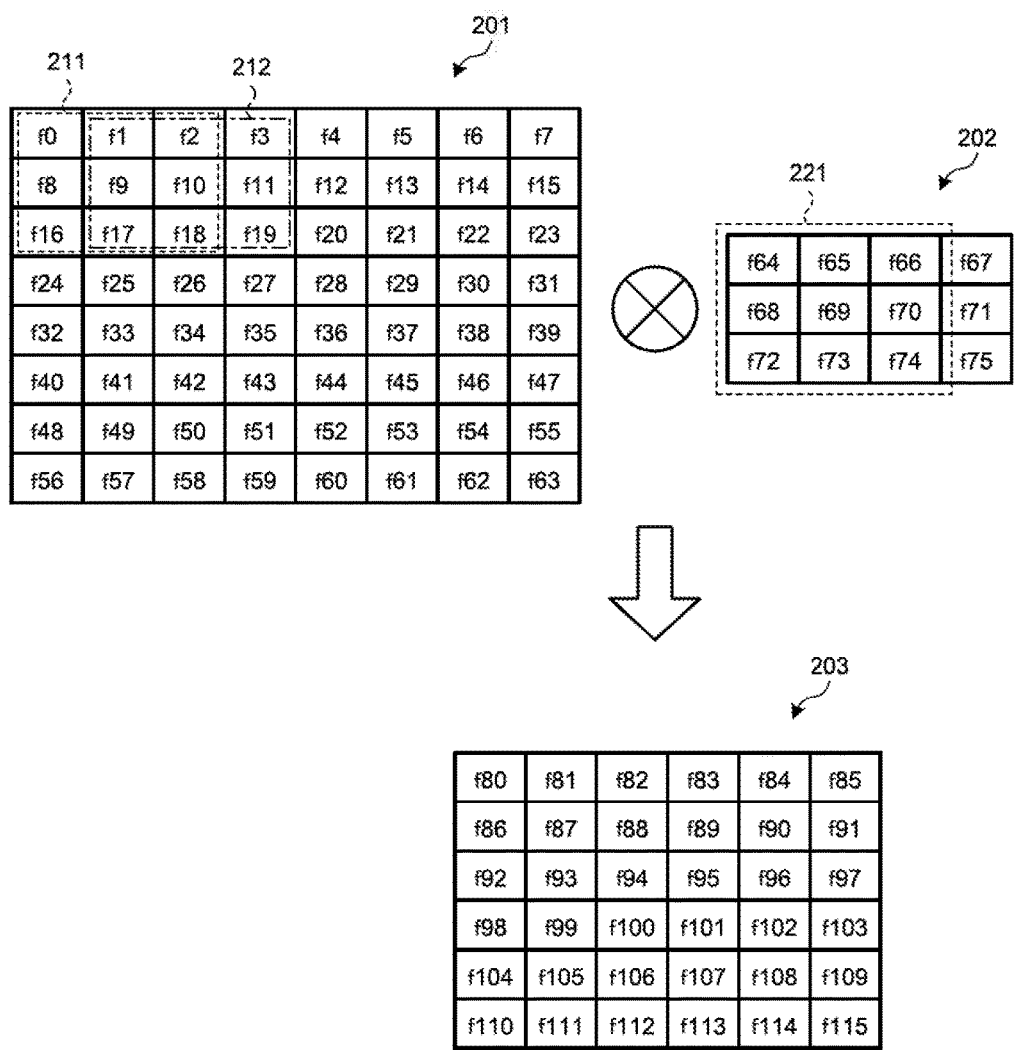
FIG. 6 is a diagram illustrating a register that stores therein pieces of data of input image data, a filter, and output image data.

Switching of the first switch 143 and the second switch 144 in the convolution operation and the convolution operation using the SIMD performed by the processing execution unit 131 are described here. FIG. 6 is a diagram illustrating a register that stores therein pieces of data of the input image data, the filter, and the output image data. FIG. 6 illustrates the floating-point registers 500 that store therein the pieces of data of the respective elements corresponding to the respective elements of the input image data 201, the filter 202, and the output image data 203. It is assumed here that there are registers corresponding to register numbers f0 to f115 as the floating-point registers 500. However, because the floating-point registers 500 having register numbers f76 to f79 are not used, these are not illustrated in FIG. 6. In the following descriptions, the floating-point registers 500 having register numbers f0 to f115 are referred to as registers f0 to f115, respectively.

The respective pieces of data in FIG. 4 are stored in the floating-point register 500 having a reference character written at a corresponding position in FIG. 6. That is, pixel values g(0,0) to g(7,7) of the input image data 201 are respectively stored in registers f0 to f63. Element values f(0,0) to f(3,2) of the filter 202 are stored in registers f64 to f75. Pieces of output image data t(0,0) to t(5,5) are stored in registers f80 to f115.

The convolution operation here is performed by using elements included in a 3×3 region surrounded by a broken line in the filter 202. In the following descriptions, the 3×3 region to be used for the convolution operation in the filter 202 is referred to as "filter 221". In the convolution operation, the filter 221 is arranged in the 3×3 region on the input image data 201, and a value obtained by multiplying the pixel value by the element value of the filter 221 corresponding to each other and adding the multiplication values becomes one pixel value of the output image data 203.

For example, the filter 221 is arranged in regions 211 and 212 on the input image data 201. Regarding the calculation when the filter 221 is arranged in the region 211, if the value held by the respective floating-point registers 500 is presented by the register number, the value is represented as described below. That is, f80=f0×f64+f1×f65+f2×f66+f8×f68+f9×f69+f10×f70+f16×f72+f17×f73+f18×f74. All the pixel values of the output image data 203 are calculated by performing the calculation by arranging the filter 221 in all the 3×3 regions on the input image data 201.

An expression when performing the calculation of these pieces of output image data 203 by the 4SIMD is illustrated as in FIG. 7. FIG. 7 is a diagram illustrating a convolution operation when a 4SIMD command is used. The fma (Fused Multiply Add) is a function representing the product-sum operation. The fma a, b, c=>d is a function having four operands to execute a×b+c=>d. As the third operand in the respective expressions in FIG. 7, values calculated by an expression one above are respectively used.

The expression included in a group 251 is for calculating the pixel value of the output image data 203 up to a position where the filter 221 is shifted one after another four times in a direction from the region 211 to the region 212. An expression included in a group 252 is for obtaining the pixel value of the output image data 203 in the remaining arrangement of the filter 221 in the expression obtained by the group 251 in the same row as the region 211. The expression included in the group 252 expresses that when the value is 0, the value is not used. That is, the convolution operation in the row of the region 211 is executed by the expression included in the groups 251 and 252. Further, an expression included in a group 253 is for performing the convolution operation in a row one down from the region 211. Further, an expression included in a group 254 is for performing the convolution operation in each row, while being shifted down one by one starting from the row two down from the region 211.

The SIMD command to execute these operations illustrated in FIG. 7 is represented, for example, as illustrated in FIG. 8. FIG. 8 is an example of the SIMD command to cause the convolution operation to be executed. FIG. 8 is a command representing an expression in a portion of the group 251 in FIG. 7. The third operand represents the pattern selection value corresponding to the simd-cfg stored in the integer register of the SIMD command. A value in which a register number is added to "%" represents data in the floating-point register 500 having the register number. For example, #2 in (#2, #2) is the storage source register corresponding to a pattern selection value #2 illustrated in FIG. 5, and expresses a state in which the storage source register in a pattern selection value #1 is rotated rightward one after another, and expresses that %f1, %f2, %f3, and %f4 are referred to in this order.

The operation code for causing the respective SIMD commands illustrated in FIG. 8 to be executed is indicated by a pseudo-code as illustrated in FIG. 9. FIG. 9 is a diagram illustrating a pseudo-code of a convolution operation using a crossbar switch. A code 261 is a command to post the pixel value of the input image data 201 on the floating-point register 500. A code 262 is a command to post the element value of the filter 202 on the floating-point register 500. A code 263 is a command to acquire data from the floating-point register 500 to perform an operation. A code 264 is a command to store the register in the memory.

The first switch 143 sequentially switches so that the processing execution unit 131 is connected to the four storage-source registers corresponding to the pattern selection value acquired by using the simd-cfg in the received SIMD command. The processing execution unit 131 retrieves data each time the first switch 143 is switched. For example, when the pattern selection value is #1, the processing execution unit 131 fetches the data from the registers f0, f1, f2, and f3 in this order. The second switch 144 is sequentially switched so that the processing execution unit 131 is connected to the four storage-source registers corresponding to the pattern selection value acquired by using the simd-cfg in the received SIMD command. The processing execution unit 131 retrieves data each time the second switch 144 is switched. For example, when the pattern selection value is ##1, the processing execution unit 131 fetches the data in order from the registers f64, f64, f64, and f64. The processing execution unit 131 performs calculation represented by the uppermost expression in FIG. 8 by using the acquired data. The processing execution unit 131 executes the codes illustrated in FIG. 9 to calculate expressions in FIG. 8 sequentially from the top, and eventually calculates expressions included in the groups 251 and 252 in FIG. 7 to acquire the element value of the output image data 203 corresponding to one row when the filter 221 is slid one after another.

Thereafter, the switch control unit 141 repeatedly performs switching of the first switch 143 and the second switch 144, and the processing execution unit 131 repeatedly performs the operation corresponding to switching. Accordingly, the processing execution unit 131 can perform the convolution operation over the entire region of the input image data 201.

Figure 10:
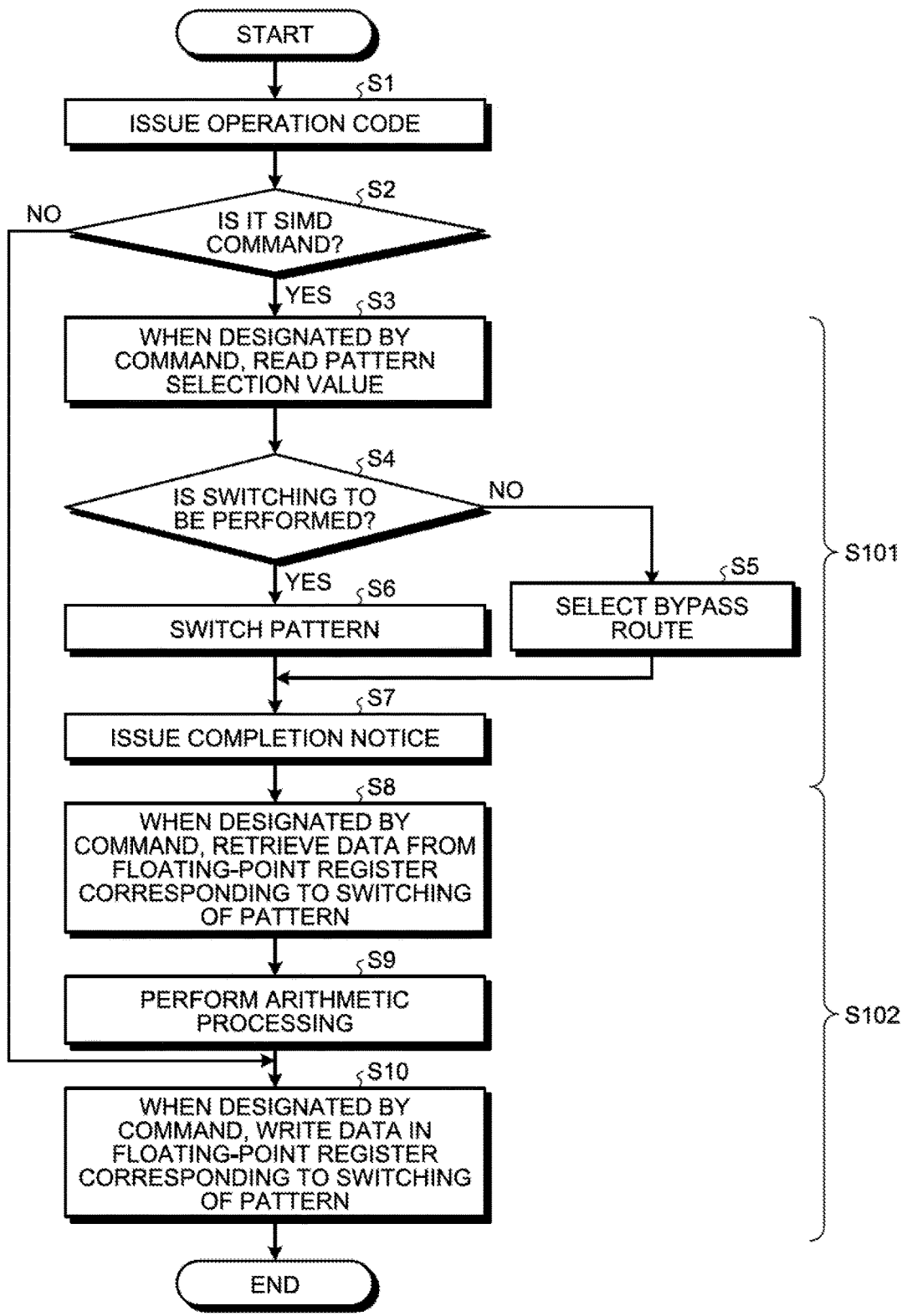
FIG. 10 is a flowchart of a command process performed by a processor according to the first embodiment.

A flow of the command process performed by the processor according to the first embodiment is described next with reference to FIG. 10. FIG. 10 is a flowchart of the command process performed by the processor according to the first embodiment.

The command fetching unit 11 acquires a command from the memory 2, and issues an operation code to the command decoding unit 12 (Step S1).

The command decoding unit 12 acquires the operation code from the command fetching unit 11. The command decoding unit 12 decodes the operation code, and outputs the decoding result to the determination unit 132. The determination unit 132 acquires the operation code decoded by the command decoding unit 12. The determination unit 132 determines whether the command is the SIMD command or the other commands (Step S2). When the command is the other commands (NO at Step S2), the determination unit 132 outputs the command to the processing execution unit 131. The processing execution unit 131 proceeds to Step S10.

On the other hand, when the command is the SIMD command (YES at Step S2), if a pattern selection value corresponding to the simd-cfg stored in the command is designated, the determination unit 132 reads the pattern selection value from the integer register 151 (Step S3). The determination unit 132 outputs the pattern selection value to the switch control unit 141. The determination unit 132 outputs the SIMD command to the processing execution unit 131.

The switch control unit 141 determines whether to perform switching depending on whether the pattern selection value is designated by the command (Step S4). When switching is not to be performed (NO at Step S4), that is, the data is acquired from the floating-point register 500 designated by the destination address, the switch control unit 141 does not perform switching of the switch. That is, the switch control unit 141 selects a bypass route (Step S5).

On the other hand, when switching is to be performed (YES at Step S4), that is, the data is retrieved from the floating-point register 500 indicated by the first or the second storage-source information, the switch control unit 141 acquires the switching pattern from the switch switching table 142. The switch control unit 141 performs switching of the first switch 143 and the second switch 144 according to the switching pattern (Step S6). Thereafter, the switch control unit 141 performs switching of a reading source or a writing destination according to the respective processes of parallel processing in one SIMD command based on the acquired one switching pattern. The operation at Step S6 is also referred to as "pattern switching", in a sense that in a new command or rotate processing that is not a complicated process, flexible change of the processing pattern is realized by the switching, without causing any addition of pre-processing or post-processing.

The switch control unit 141 then issues a switching completion notice of the first switch 143 and the second switch 144 to the processing execution unit 131 (Step S7).

When the pattern selection value is designated by the command, the processing execution unit 131 acquires the switching completion notice from the switch control unit 141. The processing execution unit 131 retrieves data from the floating-point register 500 under control of the switch control unit 141 (Step S8). When the bypass route is selected, because the switch control unit 141 does not perform switching of the switch, the processing execution unit 131 directly retrieves data from the floating-point register via the bypass route.

Next, the processing execution unit 131 performs the arithmetic processing in parallel for the number of parallel processing designated by the SIMD command (Step S9).

Finally, upon completion of the respective arithmetic processing, the processing execution unit 131 writes an arithmetic processing result in the floating-point register 500 (Step S10). Specifically, when switching is not performed at Step S4, because the switch control unit 141 does not perform switching of the switch, the processing execution unit 131 directly writes the arithmetic processing result in the floating-point register 500 via the bypass route. When switching is performed at Step S4, the switch control unit 141 writes the arithmetic processing result in the floating-point register 500, which is a switching destination according to the pattern switching, under control of the switch control unit 141.

The process at Step S101 including Steps S3 to S7 in FIG. 10 is a preparation process for execution of the SIMD command. The process at Step S102 including Steps S8 to S10 is a process of executing the SIMD command. The processing flow of one SIMD operation has been described above. However, in practice, the processor 1 repeats the SIMD operation in the flow in FIG. 10 until the convolution operation is finished.

Figure 11:
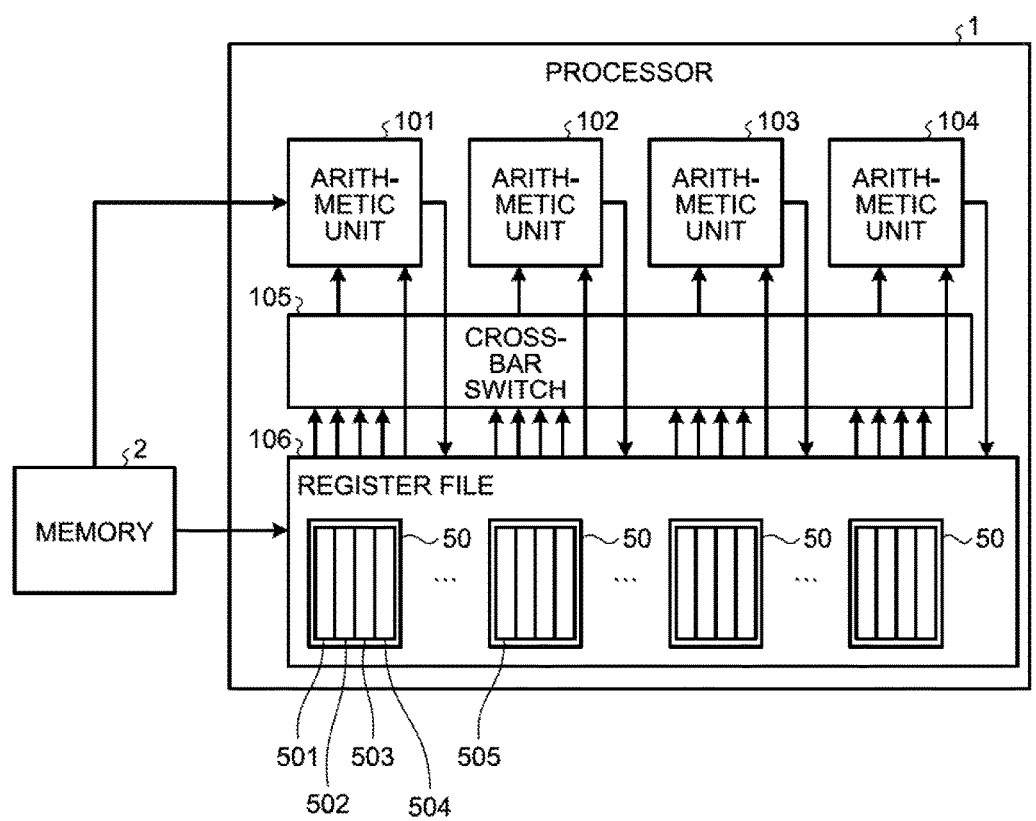
FIG. 11 is a hardware configuration diagram of the processor according to the first embodiment.

A hardware configuration of the processor 1 according to the first embodiment is described with reference to FIG. 11. FIG. 11 is a hardware configuration diagram of the processor according to the first embodiment.

The processor 1 includes arithmetic units 101 to 104, a crossbar switch 105, and a register file 106. A configuration in which there are four arithmetic units is described here; however, the number of arithmetic units is not particularly limited thereto.

The crossbar switch 105 is a switch for selecting a route connecting respective floating-point registers 501 to 504 included in the register file 106 with the arithmetic units 101 to 104. The crossbar switch 105 realizes, for example, the functions of the register switching unit 14 exemplified in FIG. 1.

The register file 106 includes the floating-point registers 500 and the integer register 151 exemplified in FIG. 1. The register file 106 realizes the functions of the data storage unit 15 exemplified in FIG. 1.

The arithmetic units 101 to 104 are respectively connected to the crossbar switch 105. The arithmetic units 101 to 104 respectively have a route directly connecting to the register file 106.

The arithmetic units 101 to 104 are CPU cores, for example. The arithmetic units 101 to 104 respectively realize the functions of the command fetching unit 11, the command decoding unit 12, and the command processing unit 13 exemplified in FIG. 1. That is, the arithmetic units 101 to 104 respectively retrieve the destination data from the register file 106 without via the crossbar switch 105, or retrieve the data from the floating-point register 500 selected by the crossbar switch 105. Each of the arithmetic units 101 to 104 executes the SIMD command.

Figure 12:
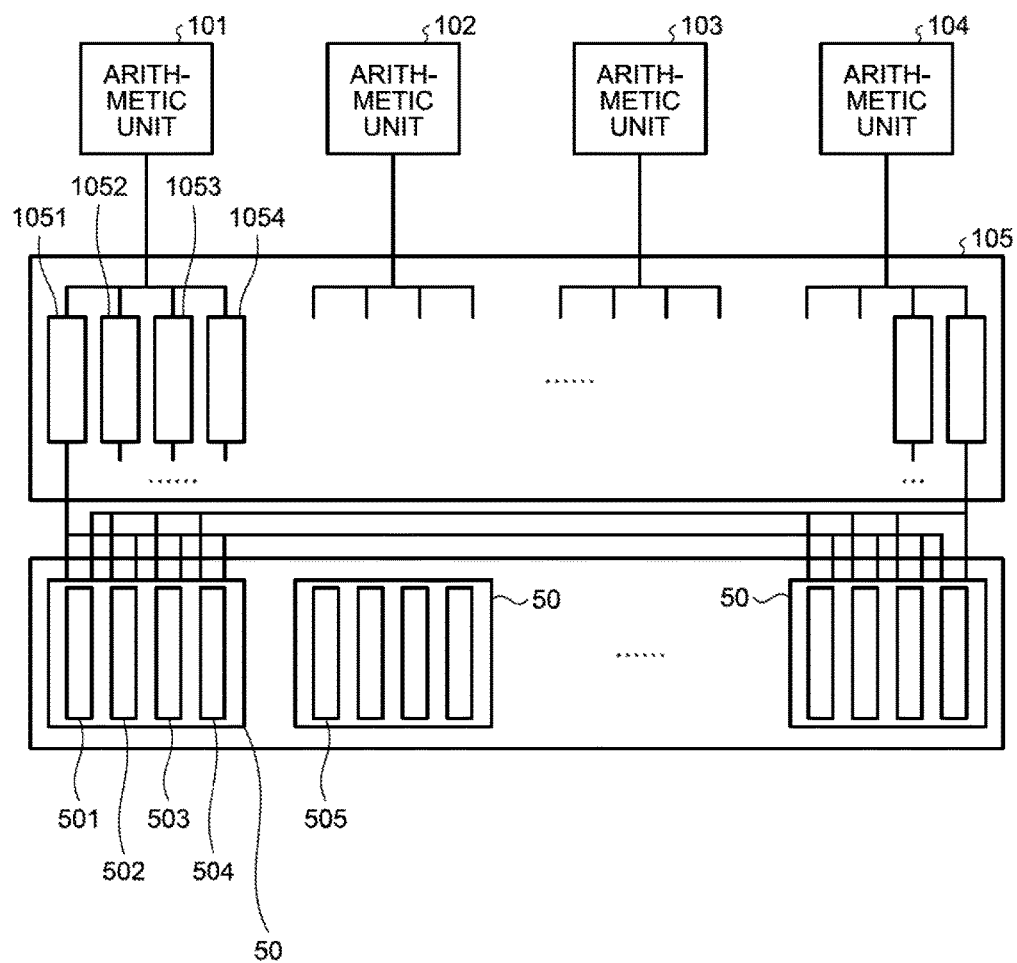
FIG. 12 is a hardware configuration diagram of the crossbar switch according to the first embodiment.

FIG. 12 is a hardware configuration diagram of the crossbar switch according to the first embodiment. The crossbar switch is described further in detail with reference to FIG. 12. The respective arithmetic units simultaneously perform readout for the number of parallel processing instructed by the SIMD command. For example, when the arithmetic unit 101 performs four processes designated by the SIMD command, one process performed by the arithmetic unit is realized in such a configuration that readout from any of the floating-point registers 500 in the respective SIMD registers 50 via an internal switch 1051 in the crossbar switch 105 can be performed, and other processes are realized similarly in the configuration that readout from any of the floating-point registers 500 in the respective SIMD registers 50 via internal switches 1052, 1053, and 1054 can be performed.

Further, when it is realized that the value held by the respective SIMD registers 50 is shifted one after another by the SIMD operation, the floating-point register 500 in the SIMD register 50 designated based on the storage-source information in the SIMD command is selected for each process by the crossbar switch 105, in order to perform the arithmetic processing for each process of the four processes designated by the SIMD command. For example, in the first process, data is retrieved from the floating-point register 501 selected by the internal switch 1051, and in other processes, data is retrieved from the floating-point registers 502 to 504 selected via the internal switches 1052 to 1054. In the next process, according to a rotate pattern in the SIMD setting information in the integer register 151 designated in the command, in the first process, data is retrieved from the floating-point register 502 selected by the internal switch 1051, and in other processes, data is retrieved from the floating-point registers 503 to 504 selected via the internal switches 1052 to 1054 and from a floating-point register 505 of the adjacent SIMD register 50. The arithmetic unit 101 executes the SIMD command. Similarly, the arithmetic units 102 to 104 also execute the SIMD command by the above method. A hardware configuration of the crossbar switch 105 to execute the SIMD command is illustrated in FIG. 12. It is realized to perform the rotate processing including the adjacent SIMD register 50 without adding any extra command, or using the pre-processing and the post-processing.

As described above, the processor according to the first embodiment includes switches that switch the route connecting the floating-point registers and the processing execution unit. The processor according to the first embodiment performs the SIMD operation while sharing the data by switching the switch. Accordingly, the same data can be shared without replacing the data stored in the floating-point registers, and the SIMD operation can be quickly performed without using any redundant command. Accordingly, the processor according to the first embodiment can improve the arithmetic processing speed.

Because the contents of the floating-point registers are not changed even if the data is shared, the contents of the floating-point registers before sharing the data can be easily used. Further, the contents of the floating-point registers before sharing the data can be easily used without using a new floating-point register, thereby enabling to suppress the cost.

Even if the rotate is performed, the floating-point register in which the data is written or from which data is retrieved is not closed in the SIMD register, and can handle the data in the other SIMD registers, thereby enabling to realize the rotate easily. Further, because there are many options of the floating-point registers to be accessed, the flexibility of the use pattern of the data stored in the floating-point registers can be improved.

[b] Second Embodiment

Figure 13:
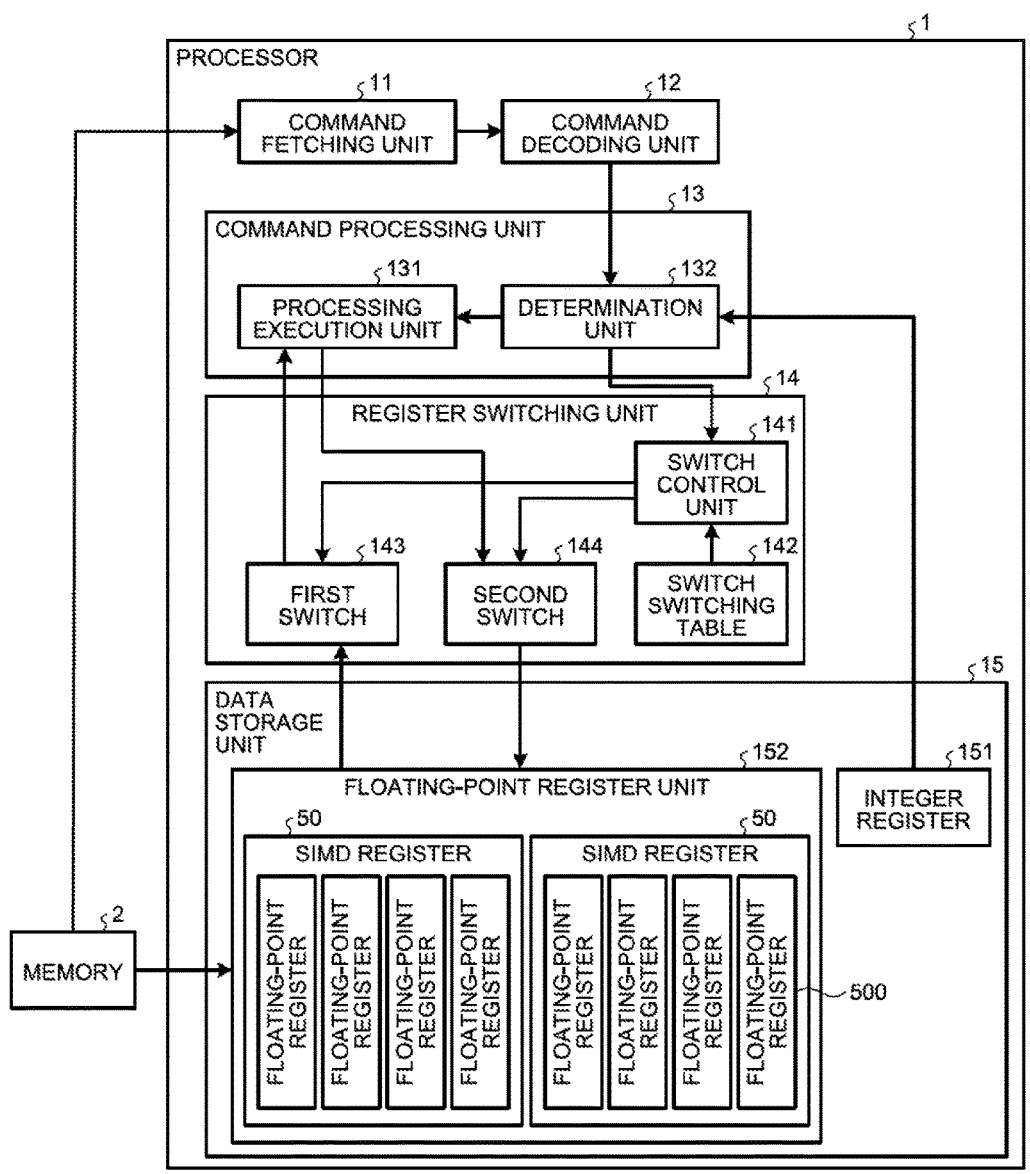
FIG. 13 is a block diagram of an 8SIMD processor according to a second embodiment.

FIG. 13 is a block diagram of an 8SIMD processor according to a second embodiment. The processor 1 according to the second embodiment is different from that of the first embodiment in that the processing execution unit 131 transmits data via the register switching unit 14 even at the time of data writing to the floating-point registers 500. In the following descriptions, explanations of functions of respectively the same units as those of the first embodiment will be omitted. An example in which processing to perform transposition of matrix is executed is described as an example of calculation using the register switching unit 14 at the time of the data writing.

Figures 14, 15:
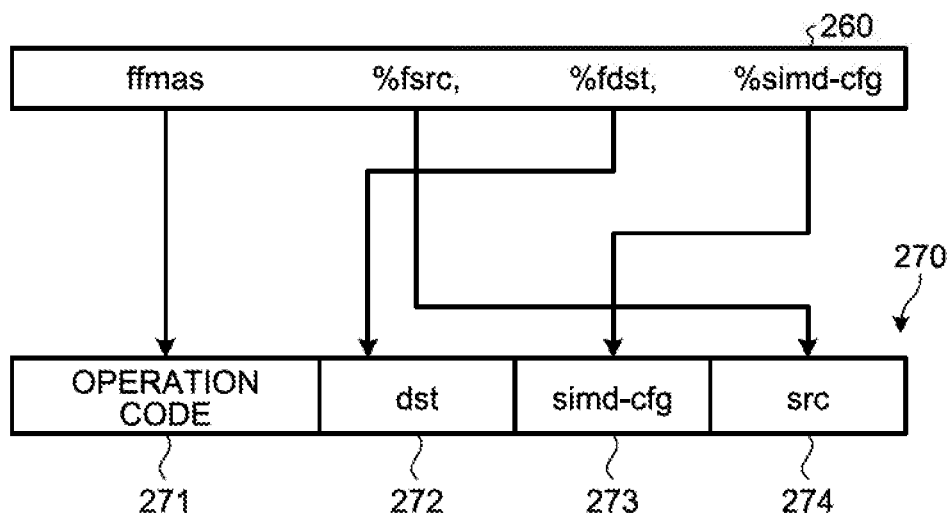
FIG. 14 is a diagram illustrating an assembly language description of a matrix transposition command using an SIMD according to the second embodiment and illustrating a format of a matrix transposition command to be generated.
FIG. 15 is a diagram of an example of a format of an integer register when an SIMD command to perform transposition of matrix is processed.

FIG. 14 is a diagram illustrating an assembly language description of a matrix transposition command using the SIMD according to the second embodiment and illustrating a format of a matrix transposition command to be generated. Corresponding to the operation code and the respective operands designated by an assembly language description 260, an operation code 271, destination information (dst) 272, storage-source information 273 of the SIMD setting information (simd-cfg), and storage-source information (src) 274 are stored in a matrix transposition command 270. For example, the operation code 271 is type information of the command. The destination information 272 is a register number of an output destination. The storage-source information 273 of the SIMD setting information is integer register number at a position where the SIMD setting information having a format of an integer register illustrated in FIG. 15. The storage-source information 274 is a register number of an input source. FIG. 15 is a diagram of an example of a format of the integer register when an SIMD command to perform transposition of matrix is processed.

A pattern selection value of a switching pattern corresponding to the value of simd-cfg designated by the SIMD command illustrated in FIG. 15 is pre-stored in the integer register 151. A pattern selection value expressed by src for designating four switching patterns of the first switch 143 in one SIMD operation is stored in an upper level of the integer register 151, as indicated in a format 154. A pattern selection value expressed by dst for designating four switching patterns of the second switch 144 in one SIMD operation is also stored in a lower level of the integer register 151, as indicated in the format 154.

In the second embodiment, register numbers illustrated in FIG. 16 are used. FIG. 16 is a diagram illustrating floating-point registers representing an 8×8 matrix. In FIG. 16, a valuable n of a natural number is used to represent the register number so that a general value can be used as the register number. In FIG. 16, the register number is represented by using values in an X-axis direction and a Y-axis direction, designating bottom left as an origin, a lateral direction as the X axis, and a vertical direction as the Y axis. Specifically, a value on the X axis is incremented by one, each time a shift to the right is made by one column. Further, each time an upward shift is made by one row, a value on the Y axis is incremented by one. The register number is represented as $f(n+8*Y+X)$. Here, X is a value on the X axis and Y is a value on the Y axis.

The information illustrated in FIG. 17 is registered in the switch switching table 142. FIG. 17 is a diagram illustrating a switch switching table according to the second embodiment. In the switch switching table 142 according to the second embodiment, eight switching patterns are registered while being matched with the pattern selection value.

When the processing execution unit 131 retrieves data, the switch control unit 141 releases connection of the second switch 144, and switches the first switch 143 in the storage source (src) switching pattern. The switch control unit 141 then releases connection of the first switch 143, and switches the second switch 144 in the destination (dst) switching pattern when the processing execution unit 131 writes data.

The processing execution unit 131 retrieves data from the floating-point registers 500 via the first switch 143 switched by the switch control unit 141. Thereafter, the processing execution unit 131 writes data in the floating-point registers 500 via the second switch 144 switched by the switch control unit 141.

Processing of transposition of matrix using an SIMD is described here. FIG. 18 is a diagram illustrating an SIMD command to execute the transposition of matrix. An mvfr command is a register transfer command, and a plurality of mvfr commands are executed to create an array in which an array of a transfer source is transposed at a transfer destination. The mvfr has three operands. The mvfr a, b, (c, d) causes to perform the following processing. That is, the processing execution unit 131 retrieves data from the floating-point register 500 connected by the switching pattern expressed by c, by using a as an operand on a readout side. The processing execution unit 131 writes the retrieved data in the floating-point register 500 connected by the switching pattern expressed by d by using b as an operand. For example, in the case of the first row in an SIMD command 320, the processing execution unit 131 uses the switching pattern selected by a pattern section value #1 indicated by the switch switching table 142 illustrated in FIG. 16 to retrieve data. Thereafter, the processing execution unit 131 writes the retrieved data by using the switching pattern selected by the pattern selection value #1 indicated in the switch switching table 142.

At the time of executing the command described in FIG. 18, the switch control unit 141 retrieves the switching pattern corresponding to the first value of the third operand from the switch switching table 142, and sequentially switches the first switch 143 according to the acquired switching pattern. The processing execution unit 131 retrieves data from the floating-point register 500 via the first switch 143 each time switching of the first switch 143 is performed.

Upon completion of readout of data according to the acquired switching pattern, the switch control unit 141 retrieves the switching pattern corresponding to the second value of the third operand from the switch switching table 142, and sequentially switches the second switch 144 according to the acquired switching pattern. The processing execution unit 131 writes data in the floating-point register 500 via the second switch 144 each time switching of the second switch 144 is performed.

Figure 19:
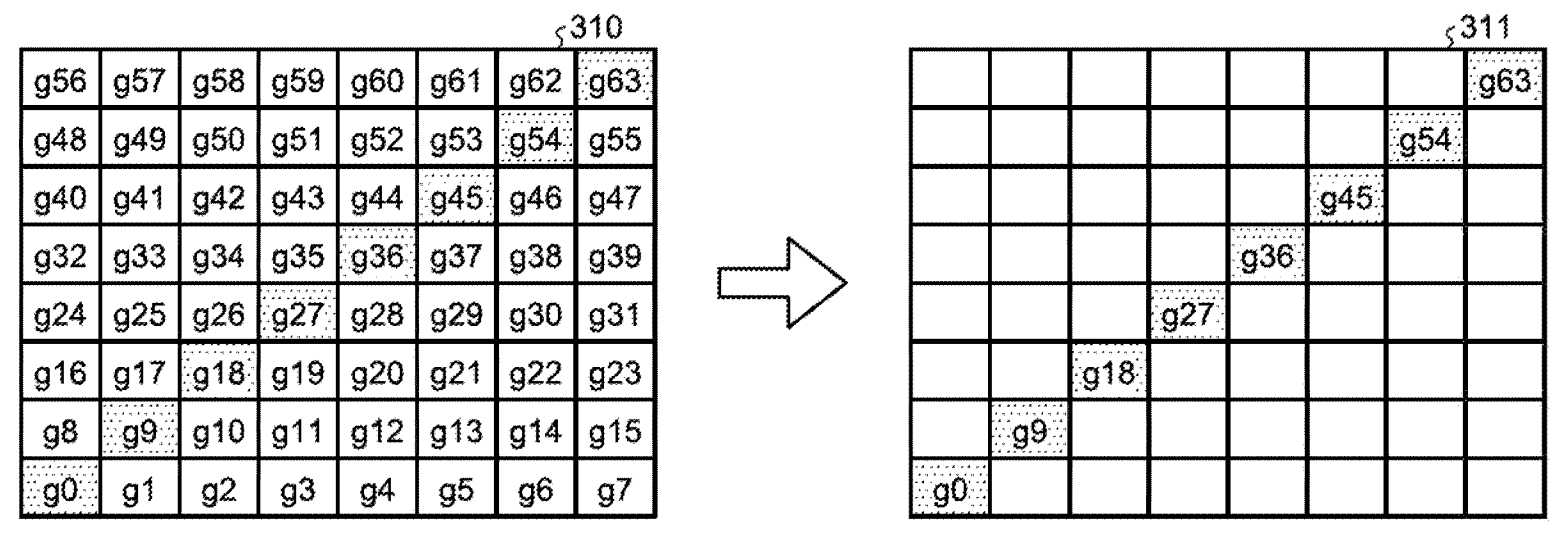
Figure 20:
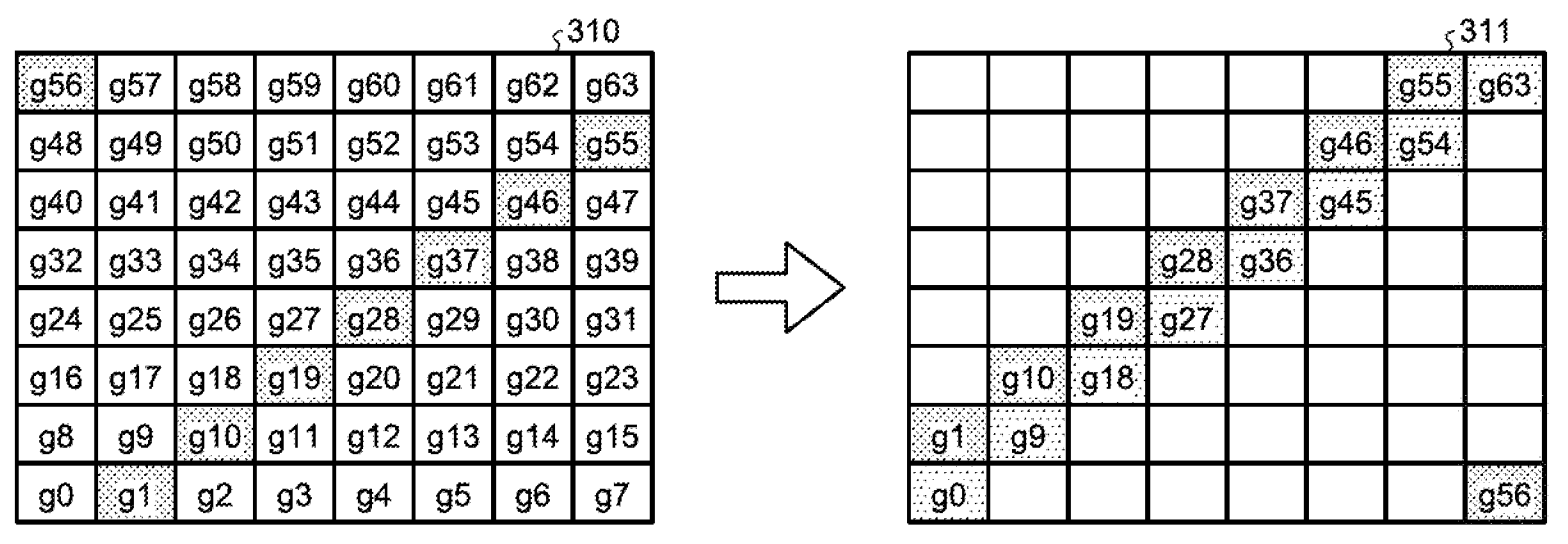
Figure 21:
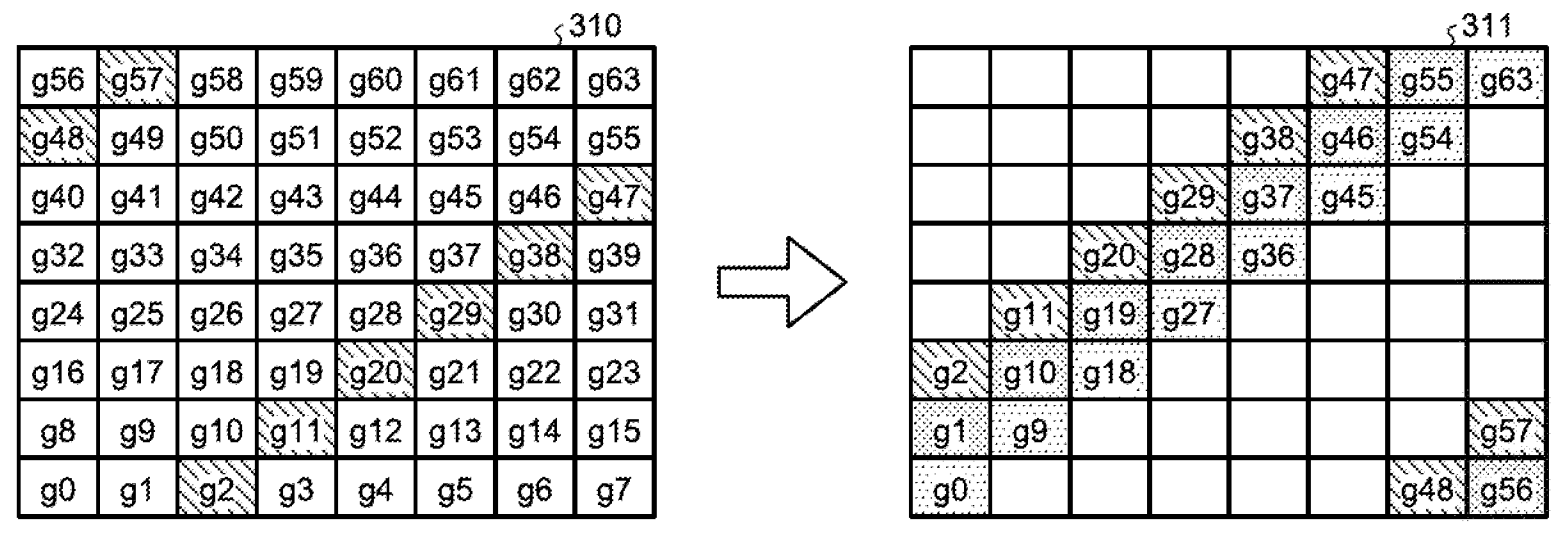

Movement of data at the time of performing an operation of transposition of matrix using the SIMD is described with reference to FIGS. 19 to 21. FIG. 19 is an explanatory diagram of a first shifting process of transposition of matrix. More specifically, FIG. 19 illustrates a process when dst is #1, and src is #1. FIG. 20 is an explanatory diagram of a second shifting process of transposition of matrix. More specifically, FIG. 20 illustrates a process when dst is #2, and src is #9. FIG. 21 is an explanatory diagram of a third shifting process of transposition of matrix. In FIGS. 19 to 21, pixel values g0 to g63 are described in each pixel of input image data 310. A case where the operation of transposition of matrix is performed according to the SIMD command 320 in FIG. 18 is described.

In FIG. 19, the input image data 310 is stored in the floating-point register 500 in a reading source. Output image data 311 is stored in the floating-point register at a writing destination. The switch control unit 141 acquires the switching pattern corresponding to the pattern selection value #1.

The switch control unit 141 then inputs n=0 to the acquired switching pattern. The switch control unit 141 switches the first switch 143 so as to acquire diagonal pixel values in the input image data 310 according to the acquired switching pattern. The processing execution unit 131 sequentially acquires pixel values g0, g9, g18, g27, g36, g45, g54, and g63 from the floating-point registers 500 corresponding to the diagonal pixels in the input image data 310 as illustrated in FIG. 18 while being matched with switching of the first switch 143.

Subsequently, the switch control unit 141 acquires the switching pattern corresponding to the pattern selection value #1. The switch control unit 141 then inputs n=64 to the acquired switching pattern. The switch control unit 141 then switches the second switch 144 so as to connect to the floating-point registers 500 corresponding to the diagonal pixels in the output image data 311 according to the acquired switching pattern. The processing execution unit 131 sequentially stores pixel values g0, g9, g18, g27, g36, g45, g54, and g63 indicating the floating-point registers 500 corresponding to the diagonal pixels in the output image data 311 as illustrated in FIG. 18 while being matched with switching of the second switch 144. That is, the pixel values g0, g9, g18, g27, g36, g45, g54, and g63 are stored in the floating-point registers 500 having register numbers f64, f73, f82, f91, f100, f109, f118, and f127 in the floating-point registers 500 at the writing destination.

The switch control unit 141 acquires the switching pattern corresponding to the pattern selection value #2. The switch control unit 141 then inputs n=0 to the acquired switching pattern. The switch control unit 141 switches the first switch 143 so as to acquire pixel values of pixels in one row below the respective diagonal pixel values in the input image data 310 according to the acquired switching pattern. It is assumed that the pixels in one row below the pixels in the lowest row of the input image data 310 are pixels in the highest row in the input image data 310. The processing execution unit 131 sequentially acquires pixel values from the floating-point registers 500 corresponding to the pixels in one row below the respective diagonal pixels in the input image data 310 as illustrated in FIG. 20, according to switching of the first switch 143. That is, the processing execution unit 131 sequentially acquires pixel values g1, g10, g19, g28, g37, g46, g55, and g56.

The switch control unit 141 then acquires the switching pattern corresponding to the pattern selection value #9. The switch control unit 141 inputs n=64 to the acquired switching pattern. The switch control unit 141 switches the second switch 144 so as to connect to the floating-point registers 500 corresponding to pixels in one row above the diagonal pixels in the output image data 311 according to the acquired switching pattern. It is assumed that the pixels in one row above the pixels in the highest row of the output image data 311 are pixels in the lowest row of the output image data 311. The processing execution unit 131 sequentially stores pixel values g1, g10, g19, g28, g37, g46, g55, and g56 in the floating-point registers 500 corresponding to the pixels in one row above the diagonal pixels in the output image data 311 as illustrated in FIG. 20 while being matched with switching of the second switch 144. That is, the pixel values g1, g10, g19, g28, g37, g46, g55, and g56 are stored in the floating-point registers 500 having register numbers f72, f81, f90, f99, f108, f117, f126, and f71 in the floating-point registers 500 at the writing destination.

The switch control unit 141 acquires the switching pattern corresponding to the pattern selection value #3. The switch control unit 141 inputs n=0 to the acquired switching pattern. The switch control unit 141 switches the first switch 143 so as to acquire pixel values of pixels two rows below the respective diagonal pixel values of the input image data 310 according to the acquired switching pattern. The processing execution unit 131 acquires pixel values from the floating-point registers 500 corresponding to the pixels two rows below the respective diagonal pixels in the input image data 310 as illustrated in FIG. 21 according to switching of the first switch 143. That is, the processing execution unit 131 sequentially acquires pixel values g2, g11, g20, g29, g38, g47, g48, and g57.

The switch control unit 141 then acquires the switching pattern corresponding to the pattern selection value #10. The switch control unit 141 then inputs n=64 to the acquired switching pattern. The switch control unit 141 switches the second switch 144 so as to connect to the floating-point registers 500 corresponding to pixels in two rows above the diagonal pixels in the output image data 311 according to the acquired switching pattern. The processing execution unit 131 sequentially stores pixel values g2, g11, g20, g29, g38, g47, g48, and g57 in the floating-point registers 500 corresponding to the pixels in two rows above the diagonal pixels of the output image data 311 as illustrated in FIG. 21 while being matched with switching of the second switch 144. That is, the pixel values g2, g11, g20, g29, g38, g47, g48, and g57 are stored in the floating-point registers 500 having register numbers of f80, f89, f98, f107, f116, f125, f70, and f79 in the floating-point registers 500 at the writing destination.

As described above, the switch control unit 141 repeatedly switches the first switch 143 so as to sequentially select the floating-point registers 500 corresponding to the pixels in one row below one after another, starting from the diagonal pixels of the matrix. The processing execution unit 131 also repeatedly retrieves data from the selected floating-point registers 500 while being matched therewith. Further, the switch control unit 141 repeatedly switches the second switch 144 so as to sequentially select the floating-point registers 500 corresponding to the pixels in one row above one after another, starting from the diagonal pixels of the matrix. Further, the processing execution unit 131 repeatedly writes data in the selected floating-point registers 500 while being matched therewith. Due to this configuration, the processing execution unit 131 acquires the output image data 311 representing transposition of matrix of the input image data 310.

Figure 22:
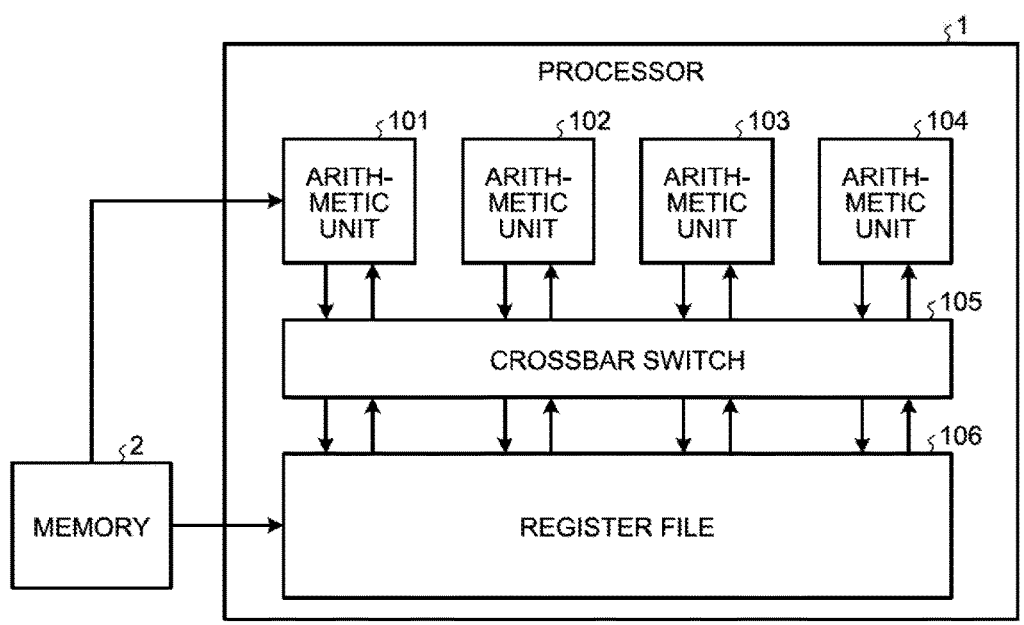
FIG. 22 is a hardware configuration diagram of a processor according to the second embodiment.

A hardware configuration of the processor according to the second embodiment is described next with reference to FIG. 22. FIG. 22 is a hardware configuration diagram of the processor according to the second embodiment.

The processor 1 includes the arithmetic units 101 to 104, the crossbar switch 105, and the register file 106. While a configuration in which there are four arithmetic units of the arithmetic units 101 to 104 is described here, the number of arithmetic units is not particularly limited thereto.

The crossbar switch 105 is a switch for selecting a route connecting the respective floating-point registers 500 included in the register file 106 with the arithmetic units 101 to 104. The crossbar switch 105 realizes, for example, the functions of the register switching unit 14 exemplified in FIG. 13.

The register file 106 includes the floating-point registers 500 and the integer register 151 exemplified in FIG. 13. The register file 106 realizes the functions of the data storage unit 15 exemplified in FIG. 13.

The arithmetic units 101 to 104 are CPU cores, for example. The arithmetic units 101 to 104 respectively realize the functions of the command fetching unit 11, the command decoding unit 12, and the command processing unit 13 exemplified in FIG. 13. That is, the arithmetic units 101 to 104 respectively retrieve data from the floating-point registers 500 selected by the crossbar switch 105. Each of the arithmetic units 101 to 104 executes the SIMD command, and writes data in the floating-point registers 500 selected by the crossbar switch 105.

According to the second embodiment, because the complicated processing such as transposition of matrix is performed, not only at the time of retrieving data for performing the arithmetic processing, but also at the time of writing an operation result as indicated in the flow in FIG. 10, the operation to write data in the floating-point registers designated by the crossbar switch is performed by using the same method. Accordingly, pre-processing or post-processing illustrated in FIGS. 19 to 21 is performed to perform the processing of transposition of matrix. However, the processing of transposition of matrix can be realized without adding any extra command or performing processing to reload data, although there is already the data in the floating-point registers.

As described above, the processor according to the second embodiment retrieves data from the floating-point register selected by the switch, and writes the execution result of the arithmetic processing in the selected floating-point register. Accordingly, the same data can be shared without replacing the data stored in the floating-point register, and the SIMD operation can be quickly performed without using any redundant command.

In the first embodiment, the case where the processing execution unit 131 performs reading and writing of data without via the first switch 143 and the second switch 144 with respect to the floating-point registers 500 at the destination has been described. However, when the convolution operation is to be performed, a configuration in which the processing execution unit 131 accesses the floating-point registers 500 at the destination via the first switch 143 and the second switch 144 can be used as in the second embodiment.

According to an aspect of the arithmetic processing device and the control method for an arithmetic processing device disclosed in the present application, an effect is obtained where the arithmetic processing speed can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device comprising:
   a storage unit that has a plurality of registers;
   a processing execution unit that performs a convolution operation by executing a predetermined number of multiply add operations in parallel by one command, by using an image data stored in a plurality of first registers of the storage unit and a filter data stored in a plurality of second registers of the storage unit, when the processing unit acquires a switching completion notice;
   a route selection unit that selects a route connecting the processing execution unit and the first and the second registers of the storage units; and
   a switching control unit that controls the route selection unit so as to switch the route to be selected, based on a switching instruction from the processing execution unit, and issues the switching completion notice to the processing execution unit.

2. The arithmetic processing device according to claim 1, wherein
   the processing execution unit notifies the switching control unit of a switching instruction including information for selecting a switching pattern of the route selection unit, and
   the switching control unit includes a plurality of switching patterns in advance, selects the switching pattern according to the switching instruction, and controls the route selection unit according to the selected switching pattern.

3. The arithmetic processing device according to claim 1, wherein
   the processing execution unit acquires a command to execute the predetermined number of operations in parallel by one command, notifies the switching instruction according to each of the commands, and retrieves the data from the storage units to perform each of the predetermined number of operations, and
   the switching control unit switches the route to be selected by the route selection unit according to each of the predetermined number of operations performed by the processing execution unit.

4. The arithmetic processing device according to claim 1, wherein
   the switching control unit controls the route selection unit so as to switch the route to be selected, at a time of reading the data or writing the data by the processing execution unit, and
   the processing execution unit executes reading and writing of the data with respect to the storage units via the route selection unit in which the route to be selected has been switched by the switching control unit.

5. A control method for an arithmetic processing device including a storage unit that has a plurality of registers, an processing execution unit, and a route selection unit, the control method comprising:
   storing an image data in a plurality of first registers and a filter data in a plurality of second registers of the plurality of registers;
   switching the route selection unit so as to switch route connecting the processing execution unit and the first and the second registers of the storage unit to provide the image data and the filter data to the processing execution unit;
   issuing a switching completion notice to the processing execution unit; and
   causing the processing execution unit to retrieve the filter data and the image data stored in the first and the second registers via the route selected by switching the route selection unit and perform convolution operation to execute a predetermined number of multiply add operations in parallel by one command.

* * * * *